United States Patent
Kim

(10) Patent No.: US 9,966,588 B2
(45) Date of Patent: May 8, 2018

(54) RECHARGEABLE BATTERY HAVING CONNECTING MEMBER FOR IMPROVING SAFETY THEREOF

(71) Applicant: SAMSUNG SDI CO., LTD., Yongin-si, Gyeonggi-do (KR)

(72) Inventor: In Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 83 days.

(21) Appl. No.: 14/838,468

(22) Filed: Aug. 28, 2015

(65) Prior Publication Data

US 2016/0260954 A1    Sep. 8, 2016

(30) Foreign Application Priority Data

Mar. 3, 2015 (KR) .................. 10-2015-0030012

(51) Int. Cl.
*H01M 2/02* (2006.01)
*H01M 2/30* (2006.01)
*H01M 2/04* (2006.01)
*H01M 2/06* (2006.01)

(52) U.S. Cl.
CPC .............. *H01M 2/30* (2013.01); *H01M 2/04* (2013.01); *H01M 2/06* (2013.01)

(58) Field of Classification Search
CPC ............ H01M 2/04; H01M 2/30; H01M 2/06
USPC ......................................................... 429/179
See application file for complete search history.

(56) References Cited

U.S. PATENT DOCUMENTS

| 8,609,269 B2 | 12/2013 | Yeo |
| 2013/0011703 A1* | 1/2013 | Kim ..................... H01M 2/30 429/61 |
| 2013/0330581 A1* | 12/2013 | Kim ..................... H01M 2/345 429/61 |
| 2017/0018814 A1 | 1/2017 | Kim et al. |

FOREIGN PATENT DOCUMENTS

| EP | 2 461 393 A1 | 6/2012 |
| EP | 2 642 561 A1 | 9/2013 |
| EP | 2 757 614 A1 | 7/2014 |
| KR | 10-2011-0046871 A | 5/2011 |
| KR | 10-2013-0043537 A | 4/2013 |

OTHER PUBLICATIONS

Extended European Search Report dated Mar. 17, 2016 for EP 15192705.0; KIM.
European Office Action dated Jan. 30, 2018, of the corresponding European Patent Application No. 15192705.0.

* cited by examiner

*Primary Examiner* — Gary Harris
(74) *Attorney, Agent, or Firm* — Lee & Morse P.C.

(57) ABSTRACT

A rechargeable battery, including a case including an internal space; an electrode assembly in the case; a cap plate coupled with an opening of the case; a first terminal electrically connected to the electrode assembly, the first terminal being on the cap plate; and a connecting member to electrically connect the first terminal to the cap plate, the connecting member including two insulation parts, the insulation parts including an insulating layer, and the connecting member further including an exposure part in which the insulating layer is not formed, the exposure part being between the insulation parts.

13 Claims, 6 Drawing Sheets

101

RECHARGEABLE BATTERY HAVING CONNECTING MEMBER FOR IMPROVING SAFETY THEREOF

CROSS-REFERENCE TO RELATED APPLICATION

Korean Patent Application No. 10-2015-0030012, filed on Mar. 3, 2015, in the Korean Intellectual Property Office, and entitled: "Rechargeable Battery Having Connecting Member," is incorporated by reference herein in its entirety.

BACKGROUND

1. Field

Embodiments relate to a rechargeable battery, for example, to a rechargeable battery having a connecting member.

2. Description of the Related Art

Unlike a primary battery that is incapable of being recharged, a rechargeable battery may be repeatedly charged and discharged. A low capacity rechargeable battery may be used in a small portable electronic device such as a mobile phone or a laptop computer and camcorder, and a large portable capacity battery may be used as a power supply for operating a motor or a large capacity storage device of, for example, a hybrid vehicle.

SUMMARY

Embodiments may be realized by providing a rechargeable battery, including a case including an internal space; an electrode assembly in the case; a cap plate coupled with an opening of the case; a first terminal electrically connected to the electrode assembly, the first terminal being on the cap plate; and a connecting member to electrically connect the first terminal to the cap plate, the connecting member including two insulation parts, the insulation parts including an insulating layer, and the connecting member further including an exposure part in which the insulating layer is not formed, the exposure part being between the insulation parts.

The insulation parts and the exposure part may be on a plane facing the cap plate.

The connecting member may include a hole, and the exposure part may surround a circumference of the hole.

A rivet terminal for electrically connecting the electrode assembly to the first terminal may be inserted into the hole.

The cap plate may include a hole, and the hole may be continuously connected from the exposure part to the insulation parts.

A ratio of an area of the exposure part to a bottom surface of the connecting member may be in a range of 10% to 38%.

A ratio of an area of the exposure part to a bottom surface of the connecting member may be in a range of 16% to 29%.

A ratio of an area of the insulation parts to a bottom surface of the connecting member may be in a range of 54% to 70%.

The insulating layer may include a coated polytetrafluoroethylene layer.

The insulating layer may include a polytetrafluoroethylene film.

The insulation parts may be spaced apart from each other in a longitudinal direction of the cap plate.

Resistance between the first terminal and the cap plate may be in a range of 27Ω to 67Ω.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
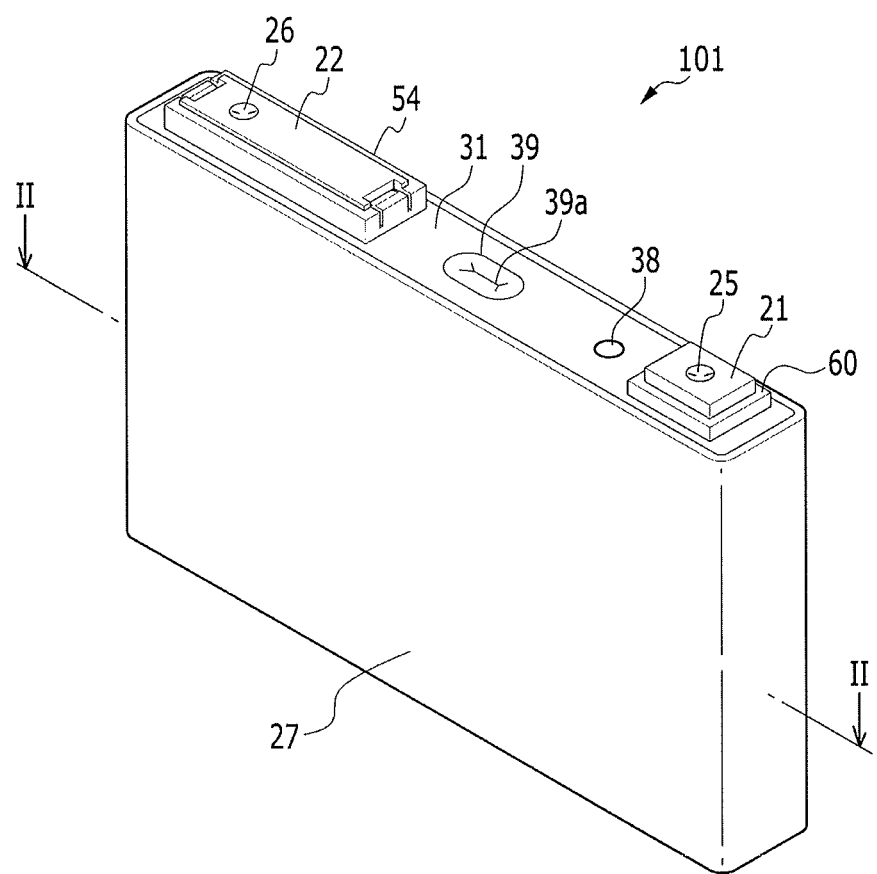
FIG. 1 illustrates a perspective view of a rechargeable battery according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The size of each layer or region shown in the drawings may be exaggerated, omitted, or schematically drawn for the purpose of convenience or clarity. It will be understood that, when one layer is referred to as being "on" another layer, it can be one layer between two layers or "directly" or "indirectly" on the other layer, or one or more intervening layers may also be present. Moreover, it will be understood that, when one layer is referred to as being "under" another layer, it can be one layer between two layers or "directly" or "indirectly" on the other layer, or one or more intervening layers may also be present. Further, it will be understood that, when one layer is referred to as being "between" other layers, it can be the only layer between two layers, or one or more intervening layers may also be present. Further, in the specification, the same constituent elements will be assigned the same reference numerals.

Figure 2:
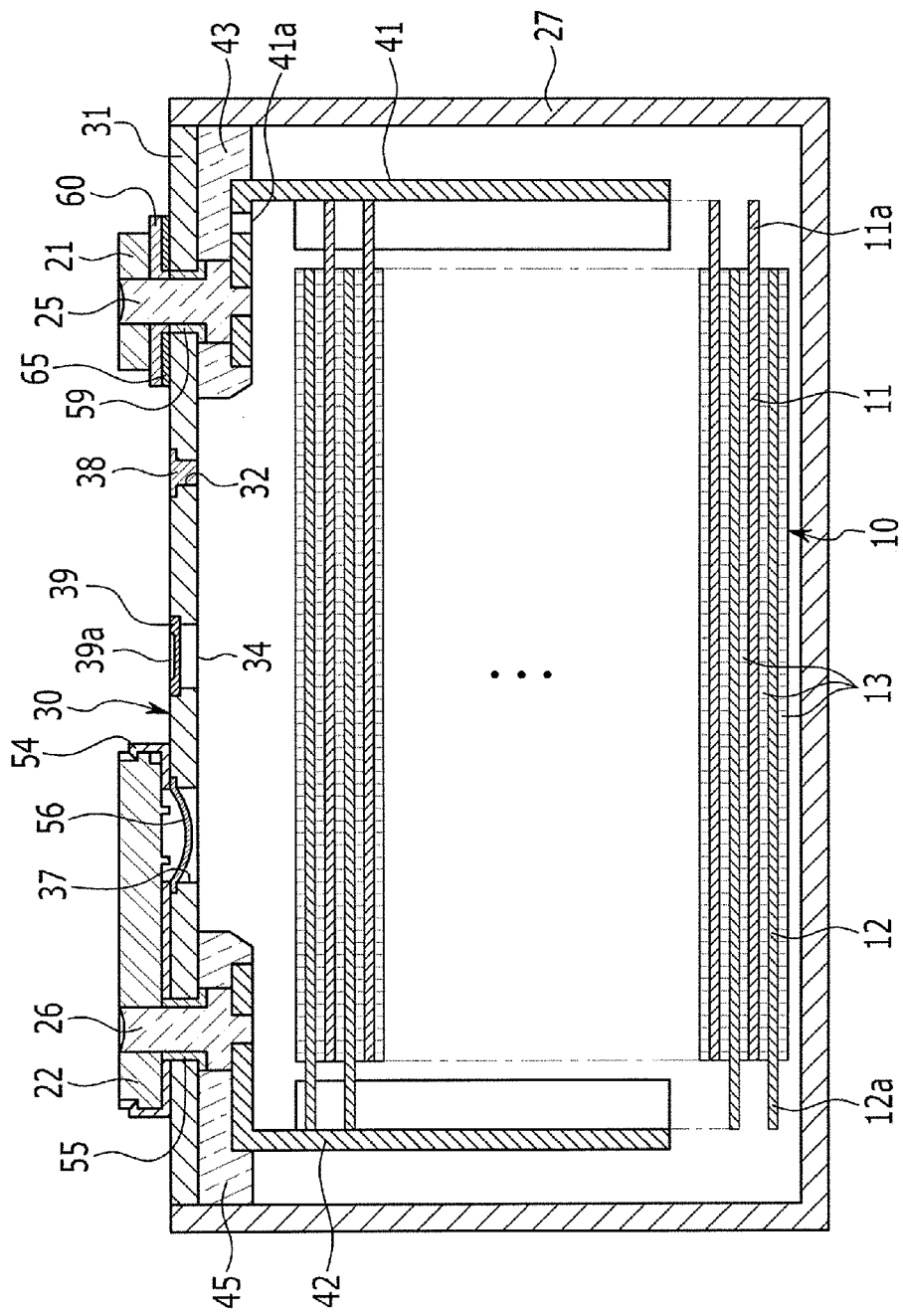
FIG. 2 illustrates a cross-sectional view taken along line II-II of FIG. 1.

FIG. 1 illustrates a perspective view of a rechargeable battery according to a first exemplary embodiment, and FIG. 2 illustrates a cross-sectional view taken along line II-II of FIG. 1.

Referring to FIG. 1 and FIG. 2, a rechargeable battery 101 according to the present exemplary embodiment may include a case 27, an electrode assembly 10, a cap plate 31, a first terminal 21, a second terminal 22, and a connecting member 60.

The case 27 may have a box shape with an internal space, and may be made of a metal such as aluminum. The case 27 may have a cuboid shape including an open upper portion. An opening may be formed at an upper portion of the case 27, and the case 27 may receive the electrode assembly 10 therein.

The cap plate 31 may be coupled with the opening of the case 27, and the cap plate 31 may close and seal the case 27. The cap plate 31 may be formed therein with an electrolyte injection opening 32 for injecting an electrolyte solution, and a sealing stopper 38 may be inserted and installed into the electrolyte injection opening 32. The cap plate 31 may be formed with a vent hole 34, a vent plate 39 formed with a notch 39a may be installed in the vent hole 34, and the vent plate 39 may be broken when internal pressure of the case 27 is equal to or greater than a predetermined pressure.

The electrode assembly 10 may include a first electrode 11, a second electrode 12, and a separator 13 disposed between the first electrode 11 and the second electrode 12. The first electrode 11 may be a positive electrode and the second electrode 12 may be a negative electrode.

The first electrode 11, the second electrode 12, and the separator 13, which may be connected to have a long band shape, may be spirally wound, and a jell-roll shape may be formed. In an embodiment, a first electrode 11 and a second electrode 12 made of a plurality of sheets may have a lamination structure while interposing a separator 13 therebetween.

The first electrode 11 may include a current collector made of a metal thin plate and a positive electrode active material layer formed on the current collector. The first electrode 11 may include a first electrode coating part, being a region in which the positive active material may be formed, and a first electrode uncoated region 11a, being a region in which the positive active material may not be formed.

The second electrode 12 may include a current collector made of a metal thin plate and a negative active material formed on the current collector. The second electrode 12 may include a second electrode coating, being a region in which a negative active material layer may be formed, and a second electrode uncoated region 12a, being a region in which the negative active material layer may not be formed. The first electrode uncoated region 11a may be disposed at one end of the electrode assembly 10, and the second electrode uncoated region 12a may be disposed at an opposite end of the electrode assembly 10.

The first electrode uncoated region 11a may be installed therein with a first current collecting member 41 to electrically connect the first terminal 21 to the electrode assembly 10. The first current collecting member 41 may be bonded to the first electrode uncoated region 11a by welding, and a rivet terminal 25 fixed to the first terminal 21 may be welded to a top end of the first current collecting member 41. The first current collecting member 41 may include a fuse part 41a having a smaller cross-section than that of a periphery. The fuse part 41a may be formed therein with a fuse hole, and if a temperature of the first current collecting member 41 is increased, the fuse part 41a may be melted to block a current. A lower insulation member 43 for insulation may be installed between the first current collecting member 41 and a bottom surface of the cap plate 31.

The rivet terminal 25 may be installed through the first terminal 21, and may be fixed to the first terminal 21 by riveting and then may be welded thereto. The rivet terminal 25 may be connected from an upper portion of the cap plate 31 to a lower portion of the cap plate 31 through the cap plate 31. A gasket 59 for sealing may be installed between the cap plate 31 and the rivet terminal 25, and the first terminal 21 may be electrically connected to the first electrode 11 through the medium of the first current collecting member 41 and the rivet terminal 25. The connecting member 60 for electrically connecting the first terminal 21 to the cap plate 31 may be installed under the first terminal 21.

A second current collecting member 42 for electrically connecting the second terminal 22 to the electrode assembly 10 may be installed under the second electrode uncoated region 12a. The second current collecting member 42 may be bonded to the second electrode uncoated region 12a by welding, and a rivet terminal 26 fixed to the second terminal 22 may be welded to a top end of the second current collecting member 42. A lower insulation member 45 for insulation may be installed between the second current collecting member 42 and a bottom surface of the cap plate 31.

The rivet terminal 26 may be installed through the second terminal 22, and may be fixed to the second terminal 21 by riveting and then may be welded thereto. The rivet terminal 26 may be connected from a lower portion of the cap plate 31 to an upper portion of the cap plate 31 through the cap plate 31. A gasket 55 for sealing may be installed between the cap plate 31 and the rivet terminal 26, and the second terminal 22 may be electrically connected to the second electrode 12 through the medium of the second current collecting member 42 and the rivet terminal 26. An upper insulation member 54 for electrically connecting the second terminal 21 to the cap plate 31 may be installed between the second terminal 22 and the cap plate 31.

The cap plate 31 may be formed therein with a short-circuiting hole 37, and a short-circuiting member 56 for short-circuiting the cap plate 31 and the second terminal 22 may be installed in the short circuit hole 37. The short-circuiting member 56 may be fixed to the cap plate 31 under the second terminal 22. When internal pressure of the rechargeable battery 101 is increased, the short-circuiting member 56 may be modified to be connected to the second terminal 22.

Hereinafter, the connecting member 60 according to the present exemplary embodiment will be described in detail.

Figure 3:
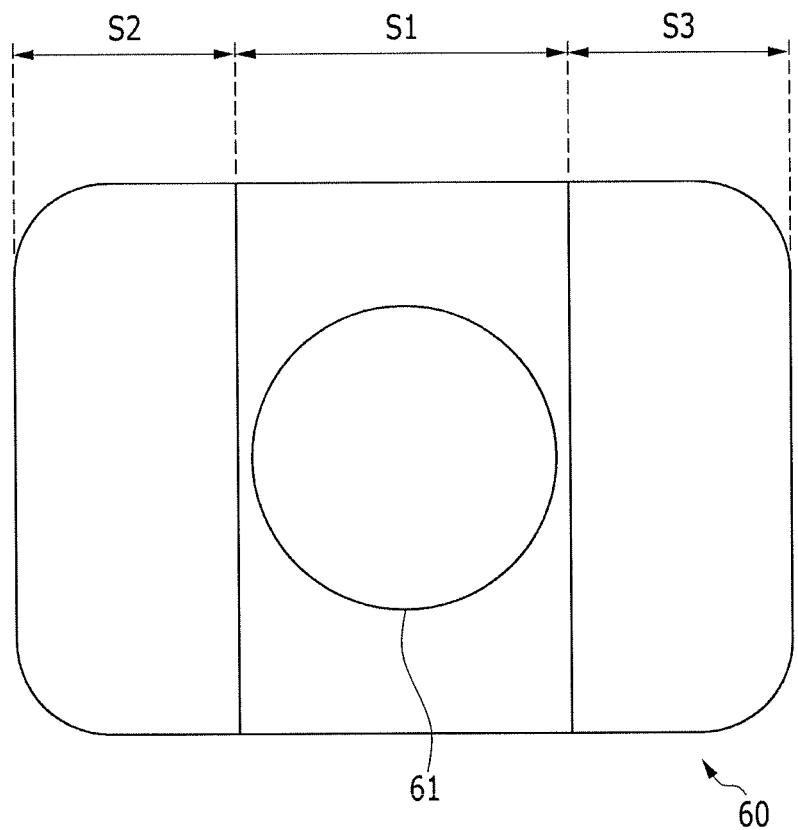
FIG. 3 illustrates a cross-sectional view taken along a connecting member of a rechargeable battery of FIG. 1.
Figure 4:
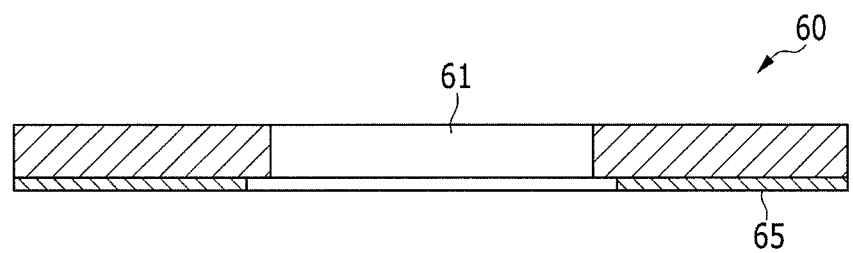
FIG. 4 illustrates a bottom view of the connecting member of a rechargeable battery of FIG. 1.

FIG. 3 illustrates a cross-sectional view taken along a connecting member of a rechargeable battery of FIG. 1, and FIG. 4 illustrates a bottom view of the connecting member of a rechargeable battery of FIG. 1.

Referring to FIG. 2, FIG. 3, and FIG. 4, the connecting member 60 may have a square plate shape. An insulating layer 65 may be formed at a plane facing the cap plate 31 in the connecting member 60. The connecting member 60 may be made of aluminum or an aluminum alloy. The insulating layer 65 may be made of a coated polytetrafluoroethylene (e.g., Teflon®) layer or a polytetrafluoroethylene film.

The plane facing the cap plate 31 in the connecting member 60 may include two insulation parts S2 and S3 formed therein with an insulating layer 65, and an exposure part S1, in which the insulating layer 65 is not formed. The exposure part S1 may be disposed between the insulation parts S2 and S3, and the insulation parts S2 and S3 may be spaced apart from each other by the exposure part S1.

The insulation parts S2 and S3 may be spaced apart from each other in a longitudinal direction of the cap plate 31, and the exposure part S1 may be disposed at a center of the connecting member 60. The connecting member 60 may be formed therein with a hole 61, in which the rivet terminal 25 may be inserted. The hole 61 may be located at the exposure part S1, and the exposure part S1 may surround a circumference of the hole 61 and the hole 61 may not make contact with the insulation part S2.

An area of the exposure part S1 may be in the range of 10% to 38% of an entire area of the connecting member 60. A ratio of an area of the exposure part to a bottom surface of the connecting member 60 may be in the range of 16% to 29%. An area of the insulation parts S2 and S3 may be in the range of 54% to 70% of that of the bottom surface of the connecting member 60.

If a ratio of an area of the exposure part S1 is less than 16%, contact resistance may be excessively increased. If the ratio of an area of the exposure part S1 is greater than 29%, an amount of heat released through an external short circuit current path may be small, and the electrode assembly 10 may be excessively heated and may combust.

Figure 5:
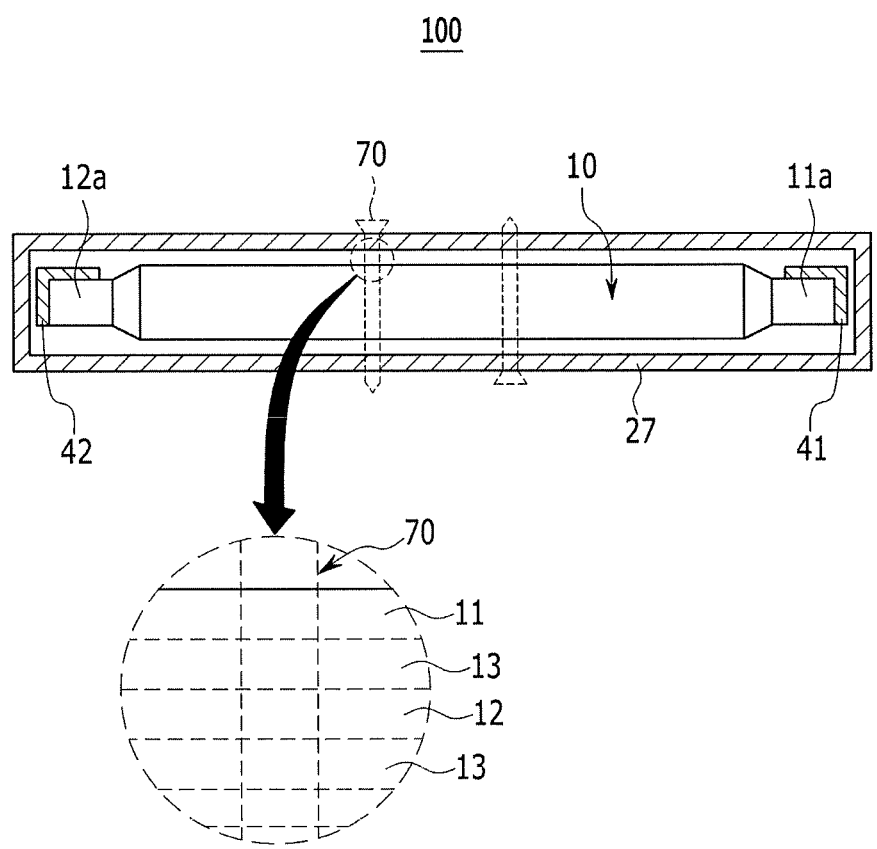
FIG. 5 illustrates a cross-sectional view of the rechargeable battery with a conductive material penetrating therein.

As shown in FIG. 5, if a conductive material 70 (i.e., a nail) pierces the rechargeable battery 101, the conductive material 70 may be sequentially formed, e.g., may penetrate, through the case 27, the separator 13, the first electrode 11, and the second electrode 12, and a short current may be generated between the first electrode 11 and the second electrode 12.

The first electrode 11 may be connected to the second electrode 12 through the conductive material 70, and an internal short circuit current path may be generated. The first electrode 11 may be connected to the second electrode 12 through the medium of the case 27, and the first terminal 21, the connecting member 60, and the cap plate 31, and an external short circuit current path may be generated.

Since the first electrode 11 and the second electrode 12 include an active material layer, even if the first electrode 11 is connected to the second electrode 12 through the conductive material 70, resistance may be relatively high. The current may flow through a low resistance portion, and the short circuit current may occur through the external short circuit current path.

As in the first exemplary embodiment, if a connecting member 60 is installed between the cap plate 31 and the first terminal 21, and contact resistance is formed between the connecting member 60 and the cap plate 31, the current may be discharged through the external short circuit current, and the current may be consumed.

If the contact resistance between the connecting member 60 and the cap plate 31 is excessively high, a temperature may be significantly increased, and heat generated from the contact resistance may be maintained at less than a predetermined level. Resistance between the first terminal 21 and the cap plate 31 according to the first exemplary embodiment may have a range of $27\Omega$ to $67\Omega$. If the area of the exposure part S1 is changed, the resistance between the first terminal 21 and the cap plate 31 may be adjusted.

The connecting member 60 may be pressurized by the rivet terminal 25. A circumference of a hole close to the rivet terminal 25 may be pressurized, the connecting member 60 may make contact with the cap plate 31, and although the insulating layer 65 may be formed, the connecting member 60 may make contact with the cap plate 31 at greater than a predetermined level.

An amount of a short circuit current flowing through a fuse part 41a of the first current collecting member 41 may be reduced proportional to an amount of the short circuit current consumed from the connecting member 60, and in accordance with the present first exemplary embodiment, as the short circuit current is consumed from the connection member 60, the short circuit current per unit time flowing through the fuse part 41a may be reduced, and a melting time of the fuse part 41a may be delayed.

According to the present exemplary embodiment, if the melting time of the fuse part 41a is delayed, a short circuit current path between the first electrode and the second electrode 12 may continue for a time corresponding to a melting delay time of the fuse part 41a.

According to the present exemplary embodiment, the short circuit current generated, for example, due to short-circuiting between the first electrode 11 and the second electrode 12, may be discharged to outside of the electrode assembly 10 for a melting delay time of the fuse part 41a and may be consumed in the connecting member, and the fuse part 41a may be melted and the short circuit current path may be eliminated and the short circuit current remaining at the electrode assembly 10 may be minimized.

If the conductive material 70 penetrates the rechargeable battery 101 to excessively heat the rechargeable battery 101, the rechargeable battery 101 may be expanded and a width direction center of the cap plate 31 may also be expanded. As in the first exemplary embodiment, if the insulation parts S2 and S3 are spaced apart from each other in a longitudinal direction of the cap plate 31, and the exposure part S1 is located between the insulation parts S2 and S3, even if the cap plate 31 is expanded, the exposure part S1 may stably make contact with the cap plate 31, and the current in the electrode assembly 10 may be stably discharged.

Figure 6:
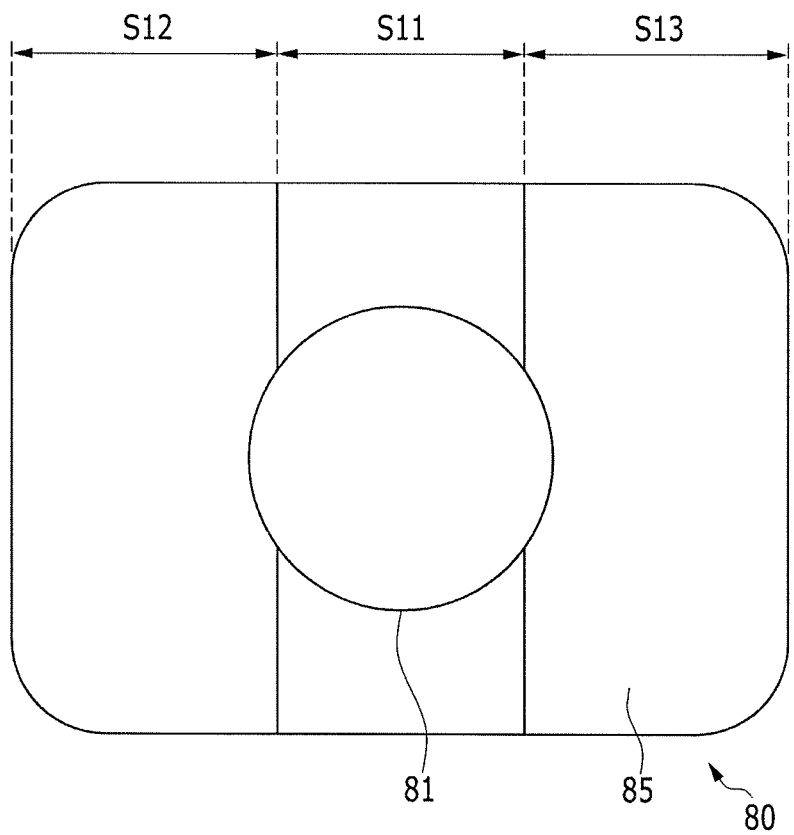
FIG. 6 illustrates a bottom view of the connecting member of a rechargeable battery of FIG. 1 according to a second exemplary embodiment.

FIG. 6 illustrates a bottom view of the connecting member of a rechargeable battery of FIG. 1 according to a second exemplary embodiment.

Since the rechargeable battery according the second exemplary embodiment is similar to the rechargeable battery according to the first exemplary embodiment, the same constituent elements will not be explained to avoid repetition.

Referring to FIG. 6, a connecting member 80 may have a square plate shape, and an insulating layer 85 may be formed at a plane facing the cap plate 31 in the connecting member 80. The connecting member may be made of aluminum or an aluminum alloy. The insulating layer 85 may be made of a coated polytetrafluoroethylene layer or a polytetrafluoroethylene film.

The plane facing the cap plate 31 in the connecting member 80 may include two insulation parts S12 and S13 formed therein with an insulating layer 85, and an exposure part S1, in which the insulating layer 85 may not be formed. The exposure part S11 may be disposed between the insulation parts S12 and S13, and the insulation layers S12 and S13 may be spaced apart from each other by the exposure part S11.

The insulation parts S12 and S13 may be spaced apart from each other in the longitudinal direction of the cap plate 31, and the exposure part S11 may be disposed at a center of the connecting member 80. The connecting member 80 may be formed therein with a hole 81, into which a rivet terminal 25 may be inserted, and the hole 81 may be connected from the exposure part S11 to the insulation parts S12 and S13.

By way of summation and review, a high power rechargeable battery may use a non-aqueous electrolyte having a high energy density. Such a high power rechargeable battery may be configured by a large capacity battery module by connecting a plurality of rechargeable batteries to each other in series to be used to drive a motor a device requiring a large amount of power, for example, an electric vehicle. Such a rechargeable battery may include a cylindrical or square case.

If, for example, a conductive material (i.e., a conductive nail) passes through the case and penetrates an electrode assembly, a negative electrode and a positive electrode constituting an electrode assembly may be short-circuited.

A temperature of the electrode assembly may be increased, for example, due to a short circuit current generated in a rechargeable battery, by short-circuiting.

Provided is a rechargeable battery having a connecting member that may form a resistor between a terminal and a cap plate.

According to an exemplary embodiment, heat generated from an assembly may be reduced when short-circuiting occurs by maintaining contact resistance between the terminal and the cap plate constant.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
a case including an internal space;
an electrode assembly in the case;
a cap plate coupled with an opening of the case;
a first terminal electrically connected to the electrode assembly, the first terminal being on the cap plate; and
a connecting member electrically connecting the first terminal to the cap plate, the connecting member including two separate insulation parts, the two separate insulation parts including two separate insulating layers, and the connecting member further including an exposure part in which the two separate insulating layers are not formed, the exposure part being between the two separate insulation parts, wherein
the first terminal is electrically connected to the cap plate through the exposure part of the connecting member.

2. The rechargeable battery as claimed in claim 1, wherein the two separate insulation parts and the exposure part are on an outer surface of the cap plate.

3. The rechargeable battery as claimed in claim 2, wherein the connecting member includes a hole, and the exposure part surrounds a circumference of the hole.

4. The rechargeable battery as claimed in claim 3, wherein a rivet terminal for electrically connecting the electrode assembly to the first terminal is inserted into the hole.

5. The rechargeable battery as claimed in claim 2, wherein the cap plate includes a hole, and the hole is continuously connected from the exposure part to the two separate insulation parts.

6. The rechargeable battery as claimed in claim 2, wherein a ratio of an area of the exposure part to a bottom surface of the connecting member is in a range of 10% to 38%.

7. The rechargeable battery as claimed in claim 2, wherein a ratio of an area of the exposure part to a bottom surface of the connecting member is in a range of 16% to 29%.

8. The rechargeable battery as claimed in claim 7, wherein a ratio of an area of the two separate insulation parts to a bottom surface of the connecting member is in a range of 54% to 70%.

9. The rechargeable battery as claimed in claim 1, wherein each of the two separate insulating layers includes a coated polytetrafluoroethylene layer.

10. The rechargeable battery as claimed in claim 1, wherein each of the two separate insulating layers includes a polytetrafluoroethylene film.

11. The rechargeable battery as claimed in claim 1, wherein the two separate insulation parts are spaced apart from each other in a longitudinal direction of the cap plate, and are disconnected from each other.

12. The rechargeable battery as claimed in claim 1, wherein resistance between the first terminal and the cap plate is in a range of 27 Ω to 67 Ω.

13. The rechargeable battery as claimed in claim 1, wherein the exposure part of the connecting member directly contacts the cap plate.

* * * * *